United States Patent
Tharp

(10) Patent No.: US 8,172,207 B2
(45) Date of Patent: May 8, 2012

(54) GAS DIFFUSER MEMBRANE WITH COATED SUBSTRATE

(75) Inventor: Charles E. Tharp, Columbia, MO (US)

(73) Assignee: Environmental Dynamics International, Inc., Columbia, MO (US)

( * ) Notice: Subject to any disclaimer, the term of this patent is extended or adjusted under 35 U.S.C. 154(b) by 0 days.

(21) Appl. No.: 12/881,268

(22) Filed: Sep. 14, 2010

(65) Prior Publication Data

US 2011/0003115 A1    Jan. 6, 2011

Related U.S. Application Data

(62) Division of application No. 11/428,431, filed on Jul. 3, 2006, now Pat. No. 7,815,974.

(51) Int. Cl.
 *B01F 3/04* (2006.01)
(52) U.S. Cl. .................................................. 261/122.1
(58) Field of Classification Search .............. 261/122.1, 261/122.2, DIG. 70
See application file for complete search history.

(56) References Cited

U.S. PATENT DOCUMENTS

| | | | | |
|---|---|---|---|---|
| 3,651,003 A | * | 3/1972 | Bechtold | ........................ 524/91 |
| 5,238,471 A | | 8/1993 | Blanchet-Fincher | |
| 5,262,096 A | * | 11/1993 | Egashira | .................... 261/122.1 |
| 5,422,043 A | * | 6/1995 | Burris | ........................ 261/122.1 |
| 6,486,291 B2 | | 11/2002 | Mrozinski et al. | |
| 6,543,753 B1 | | 4/2003 | Tharp | |
| 6,648,147 B1 | | 11/2003 | Lydon et al. | |
| 6,759,129 B2 | | 7/2004 | Fukushi | |
| 7,311,299 B2 | * | 12/2007 | Sasajima | .................... 261/122.1 |
| 7,674,514 B2 | * | 3/2010 | Frankel et al. | ................. 428/131 |
| 2005/0003204 A1 | | 1/2005 | Frankel et al. | |
| 2006/0257555 A1 | | 11/2006 | Brady et al. | |
| 2007/0001323 A1 | | 1/2007 | Kang | |
| 2007/0128394 A1 | | 6/2007 | Frankel et al. | |

OTHER PUBLICATIONS

SSI Clearly Water Belufter Membraner, PUMPTEKNIK ApS, 2011.
SSI Performance Testing, SSI Stamford Scientific International Inc., 2011.
Complete Aeration Solutions for the Wastewater Industry, SSI Stamford Scientific International Inc., 2011.

* cited by examiner

*Primary Examiner* — Charles Bushey
(74) *Attorney, Agent, or Firm* — Husch Blackwell LLP

(57) ABSTRACT

A flexible diffuser membrane for diffusing gas into a liquid includes a substrate covered wholly or partially by a thin fluorocarbon elastomer coating. The coating is applied after the substrate has been fully constructed and cured. The coating is then mixed with an adhesive catalyst and applied by spraying or in another suitable manner to the substrate. The substrate and coating are then heated to a temperature such as 350° F.-800° F. adequate to form a strong chemical, molecular, and adhesive bond between the coating and substrate. Perforations are formed in the membrane, the substrate may be treated with a biocide allowing the uncoated edges of the perforations to be coated with the biocide and resist biological growth.

6 Claims, 1 Drawing Sheet

GAS DIFFUSER MEMBRANE WITH COATED SUBSTRATE

CROSS-REFERENCE TO RELATED APPLICATIONS

This application is a Divisional of and claims priority to U.S. patent application Ser. No. 11/428,431 filed on Jul. 3, 2006, which issued as U.S. Pat. No. 7,815,974 on Oct. 19, 2010 to Charles E. Tharp entitled "Gas Diffuser Membrane With Coated Substrate," the entire disclosure of which is hereby incorporated by reference to the extent permitted by law.

FIELD OF THE INVENTION

This invention relates generally to the field of gas diffusion and more particularly to a gas diffuser membrane having a substrate that is coated with a fluoroelastomer polymer.

BACKGROUND OF THE INVENTION

Flexible membrane diffusers have been used in the diffusion of gases into liquids, one example being the aeration of wastewater. The flexible membranes have been used with tubular and disc type diffusers. Exemplary of a tubular membrane diffuser is U.S. Pat. No. 4,960,546 to Tharp.

Flexible membrane diffusers are conventionally constructed of rubber or a similar material which is punctured to provide a large number of perforations. When gas is applied to the diffuser, the gas pressure expands the membrane away from the diffuser body and causes the perforations to open so that the gas discharges through them in the form of fine bubbles, which transfer gas efficiently to the liquid. When the gas pressure is relieved, the membrane collapses on the diffuser body to close the perforations and prevent the liquid from entering the diffuser.

Although flexible membrane diffusers are advantageous in many respects and have achieved widespread acceptance in a variety of gas diffusion applications, they are not wholly free of problems. Rubber or synthetic rubber is typically used to construct the membrane. In a wastewater treatment application and in other applications, materials in the liquid can become deposited on and build up on the membrane to clog or partially clog the perforations and thus reduce the efficiency of the diffuser. For example, fats, grease and other substances which are commonly found in wastewater can adhere to the membrane. Calcium and calcium compounds such as calcium carbonate and calcium sulfate as well as other substances are especially problematic when they precipitate and build up on the diffuser membrane. Biological growth can also build up and compromise the diffuser efficiency.

Diffuser membranes can also be chemically degraded by solvents and various other types of chemicals that may be present in the liquid. This chemical degradation combined with the repeated expansion and contraction of the membrane can weaken the membrane and cause premature structural failure.

Pending U.S. patent application published under publication number U.S. 2005/00324A1 discloses a multiple layer article which is indicated as being useful as a diffuser membrane. A fluoroelastomer film is applied to a partially cured substrate, and the film and the substrate are thereafter cured together to complete the construction of the membrane.

This multiple step process is disadvantageous in a number of respects. First, it is complicated and costly. Also, because the substrate is only partially cured in the initial step and the film has been applied before the substrate and film are heated together, it is not possible to optimize both the curing of the rubber substrate and the bonding of the fluoroelastomer film to the substrate. The time and temperature requirements for curing differ from those necessary to achieve optimal bonding between the two materials, so either the curing or the bonding must necessarily be compromised. The result is a product that has either an inadequately cured substrate or an inadequate bond between the layers.

Another problem is that there is no opportunity to clean the substrate because the curing process is interrupted and is only partially completed at the time the film is applied at an elevated temperature. If contaminants are present, they cannot be removed by solvents or other cleaning processes and can interfere with the bonding to the point of destroying any ability to properly bond the materials together. The fluoroelastomer layer must be applied as a film, thus making it impossible to apply the coating layer in other manners such as spraying, brushing, rolling, electrostatic application or other application techniques which may be preferable in some cases. For similar reasons, the ability to vary the coating thickness is limited.

Another problem with this process is that the substrate remains uncoated within the perforations and is subject to biological buildup at those locations. If biological growth accumulates on the edges of the perforations, severe clogging can occur and significantly reduce the membrane efficiency, a decided possibility when the environment is difficult from a biological standpoint.

SUMMARY OF THE INVENTION

The present invention is directed to an improved flexible diffuser membrane and to an improved method of constructing a flexible membrane which takes advantage of the benefits of a flexible material as a substrate while providing a coating which acts to resist chemical attack and material buildup on the membrane.

In accordance with a preferred embodiment of the invention, a flexible diffuser membrane is uniquely constructed to take full advantage of the desirable qualities of both conventional membrane materials and fluorocarbon elastomers, using a novel process to construct the membrane. A substrate formed of a flexible material such as EPDM, NBR, a blend based compound, a fabric material or another substance is first fully constructed and only then is a fluorocarbon elastomer coating applied to the substrate, along with an adhesive catalyst to assure effective bonding of the coating to the substrate. The resulting membrane structure is then heated to an elevated temperature which is preferably high enough to effect sintering or a reaction of the catalyst and the substrate to create a strong adhesive, chemical and molecular bond.

This membrane structure and the manner of constructing it provide numerous benefits. First, the substrate is fully cured to assure that it is properly formed and exhibits optimum characteristics such as structural integrity, flexibility and other beneficial attributes that can be achieved using the proper curing process and temperature. Also, because the substrate is fully constructed as the first step, it can be cleaned before the coating is applied using solvents or otherwise to remove contaminants that might interfere with adhesion of the coating. With the fluorocarbon elastomers and the adhesive catalyst applied as a mixture the membrane can be heated to as high a temperature as is necessary to assure a strong chemical bond and molecular bond of the coating to the substrate (such as 700° F. or higher). Additionally, the coating can be applied to whatever thickness is desired by whatever application technique is desired, and it can be applied to both the inside and outside surfaces of the membrane. If desired, the diffuser membrane can be treated with a biocide as taught by U.S. Pat. No. 6,543,753 to Tharp which sows the substrate blended with a biological resistant material (biocide). With the substrate properly treated in accordance with this teaching, uncoated edges of the perforations that are created when the membrane is punched for service will contain a biocide for resisting biological growth that might otherwise clog the diffuser pores.

The result is a flexible membrane that takes advantage of the structural integrity and flexibility of the substrate while having a coating that resists adhesion of foreign materials, biological buildup and chemical degradation. At the same time, the edges of the membrane perforations can remain uncoated to retain their hydrophilic characteristics to enable the formation of fine bubbles and can be treated with a biocidal agent to resist the biological buildup that might otherwise occur. The process for constructing the membrane is simple, efficient, and cost effective.

DETAILED DESCRIPTION OF THE PREFERRED EMBODIMENT

The present invention is directed to a flexible diffuser membrane and to a process of constructing the membrane. Membranes of this type are used in various applications in which gases of various types are diffused into liquids of various types. One example is a wastewater treatment system in which flexible membrane diffusers are commonly used to diffuse air into the wastewater for aeration and mixing purposes. Flexible membrane diffusers are used in this type of application both on tubular diffusers and disc diffusers.

Figure 1:
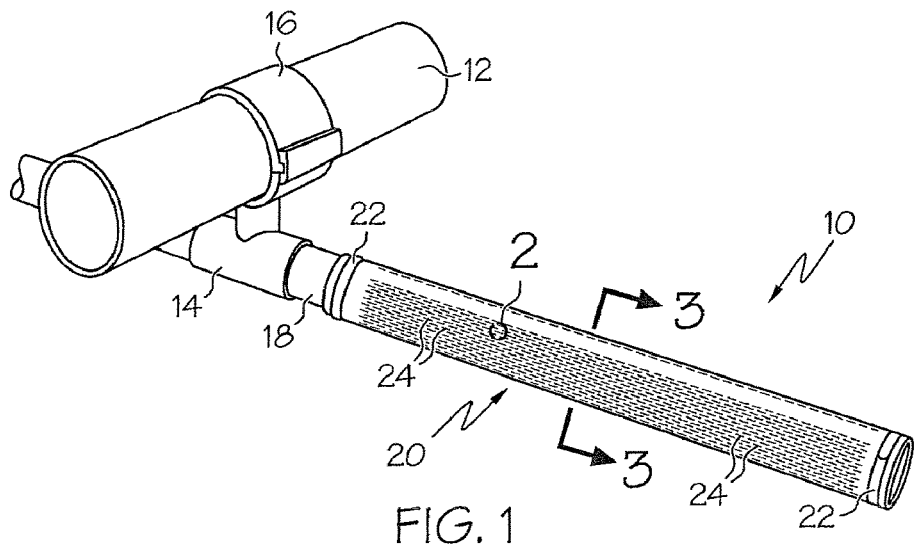
FIG. 1 is a fragmentary perspective view of a portion of an aeration system for aerating wastewater that is equipped with a tubular diffuser having a flexible membrane constructed according to a preferred embodiment of the present invention.

While FIG. 1 depicts a tubular membrane diffuser generally identified by numeral 10, it is to be understood that the invention is equally applicable to membranes for disc diffusers and other types of diffusers that are used both in water and wastewater treatment as well as in the diffusion of various types of gases into other liquids.

The diffuser 10 is used in aeration system which includes a variety of air lateral pipes such as the pipe 12 which may be floating on the surface of the liquid or submerged. Air or another gas is supplied to the pipe 12 and is discharged into a tee-fitting 14 connected with a saddle structure 16 used to mount the diffuser assembly on the pipe 12. FIG. 1 depicts tubular diffusers extending from each of the side outlets of the tee-fitting 14 (one shown only fragmentarily), although other arrangements are possible. Diffuser systems and structures different from what is shown in FIG. 1 are within the scope of the invention.

The diffuser 10 includes a hollow rigid diffuser body 18 which is connected with an outlet of the tee-fitting 14 and extends generally horizontally. The diffuser body 18 is provided with one or more openings (not shown) which discharge the gas within a flexible membrane 20 secured to the diffuser body 18 by band clamps 22 or other suitable fasteners. The membrane 20 is provided with a plurality of small perforations 24 which may take the form of slits arranged in any desired pattern.

When air is applied to the diffuser body 18 from the lateral pipe 12, the gas pressure causes the membrane 20 to expand from the diffuser body 18, thus opening the perforations 24 and discharging the gas through the perforations into the liquid in the form of fine bubbles which are beneficial in that they efficiently transfer the gas to the liquid. When the gas pressure is relieved, the flexible membrane 20 collapses back onto the diffuser body 18 and thus closes the perforations 24 so that the liquid is unable to leak into the diffuser.

Figure 3:
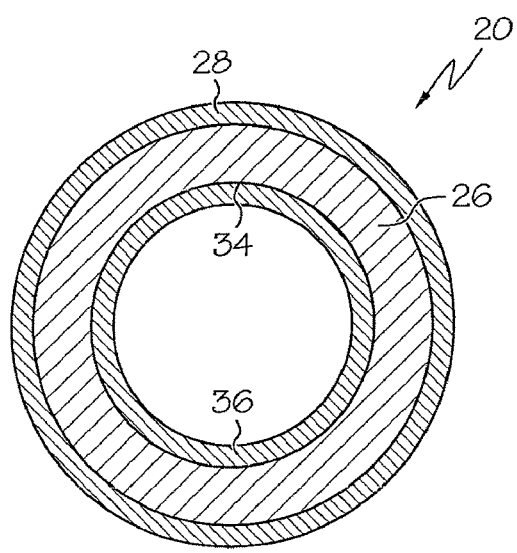
FIG. 3 is a sectional view of the membrane on an enlarged scale taken generally along line 3-3 of FIG. 1 in the direction of the arrows, with the coating thicknesses exaggerated for purposes of illustration.

The present invention is directed specifically to the construction of the membrane 20. As best shown in FIG. 3, the membrane 20 is a multi-layered structure which includes a substrate 26 having, in this example, a tubular shape. The substrate 26 may be constructed of any suitable material that exhibits the necessary structural properties and flexibility. Examples of materials that are suitable for the substrate 26 are elastomer based rubber compounds such as EPDM, nitrile rubber, NR, or various fabrics and other polymers, as well as other substances having the necessary qualities. The substrate 26 is provided with a coating 28 which may cover the entire outside surface of the substrate 26 or any selected part of the substrate, depending upon the application in which the diffuser is to be used. The coating 28 may be a fluorocarbon elastomer or fluoroelastomer polymer such as PTFE or another suitable material that can be adequately bonded to the substrate 26 and has the ability to resist solvents and other chemicals and to resist adhesion of fat, grease, biological growth and other contaminants in the liquid that can damage conventional elastomers and other membrane materials.

The membrane 20 is constructed by first manufacturing and fully curing the substrate 26. After the substrate 26 has been constructed, its surface (inside and outside surfaces if desired) may be cleaned with solvents or other materials using various types of cleaning techniques to eliminate any foreign materials that may interfere with the strength of the bonding of the coating 28 to the substrate 26.

After the substrate 26 has been cleaned adequately, the coating 28 is applied. The coating 28 is mixed with a suitable adhesive catalyst that may be any suitable type selected to effect a strong bond with the substrate 26. After the coating 28 and the catalyst have been mixed, they are applied to the surface of the substrate 26 in any suitable manner, including application by spraying, brushing, rolling, electrostatic application or another technique. After the coating 28 has been applied to the desired thickness, the substrate 26 and coating 28 are together heated to an elevated temperature selected to achieve sintering or bonding of the coating to the substrate creating maximum cross-linking, chemical bonding, molecular bonding and adhesive bonding of the coating 28 to the substrate 26. Depending upon the materials, the temperature to which the substrate and coating is heated to obtain maximum bonding may be in the range of about 350° F. to about 800° F. Preferably, the substrate 26 and coating 28 are heated together to a temperature between approximately 600° F. and 700° F. for most suitable materials. The sintering or cross-linking and chemical, molecular or adhesive bonding effected by heating to these temperature ranges, together with the presence of the adhesive catalyst, creates a bond between the coating 28 and substrate 26 which is able to withstand the forces applied to the membrane 20 in normal service.

Figure 2:
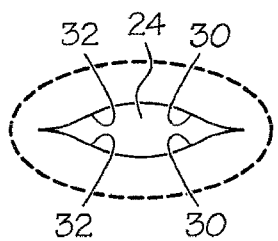
FIG. 2 is a fragmentary enlarged view of one of the perforations identified in FIG. 1 by detail 2.

After the coating 26 has been applied to the substrate 26 in this manner the perforations 24 are formed through the coating and substrate by conventional techniques. As best shown in FIG. 2, each of the perforations 24 presents edges 30 which are devoid of the coating 28. This is a desirable effect because it maintains the perforation edges 30 as the hydrophilic material of the substrate 26. As a result of this hydrophilic quality of the edges 30, the bubbles that are released from the membrane 20 into the liquid are extremely fine bubbles which are efficient in transferring gas to the liquid and thus enhance the overall efficiency of the gas diffusion process.

If desired, the body of the substrate may be treated with a suitable biocide agent as disclosed in U.S. Pat. No. 6,543,753 to Tharp, and when the coating is perforated, this biocide agent will be exposed to the liquid being treated and prevent or resist the build up of biological growth on the edges 30. Avoiding biological growth is of significant importance and is therefore preferred in that it maintains the perforations 24 in an unclogged state and is particularly preferred if the diffuser is used in a severe biological environment. Any suitable biocidal agent may be used, including biocides disclosed in U.S. Pat. No. 6,543,753 to Tharp.

The substrate 26 has an inside surface 34 which may optionally be provided with a coating 36. The inside coating 36 is applied in a similar manner as the coating 28 and acts to protect the inside substrate surface 34.

The coatings 28 and 36 (if provided) prevent contaminants in the liquid from becoming deposited on and accumulating on the membrane 20, as the coating 26 presents a slick or nonstick surface that resists adhesion of the foreign materials. The coatings 28 and 36 are also beneficial in that they resist the growth of biological materials that could otherwise build up on the substrate 26. The coatings 28 and 36 are also resistant to chemicals and other solvents that can chemically attack and degrade or destroy the substrate 26.

Accordingly, the membrane 20 of the present invention takes advantage of the beneficial attributes of the substrate 26 (physical and structural properties and flexibility) along with the protective qualities provided by the coating 28 (and 36 if provided). At the same time, the efficiency of the membrane 20 is enhanced by maintaining the perforations 24 unclogged and having the body of the diffuser or the substrate treated with the biocide agent 32 which then presents biocide treated edges of the opening 30 to the wastewater and avoids any biological build up in the perforations 24 which could inhibit their ability to discharge the gas.

The process by which the membrane 20 is constructed is advantageous in that it is simple and inexpensive. By completely constructing and curing the substrate 26 before the coating 28 (and optionally 36) is applied, the substrate 26 can be constructed to provide the optimal physical qualities, and the substrate and coating (or coatings) can then be heated together to the proper temperature to effect the strongest possible bond between the coating and the substrate so that the coating is not susceptible to peeling off of the substrate in service.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A flexible gas diffuser membrane for applying gas to a liquid, comprising:
   a fully cured flexible substrate applicable to a diffuser body;
   a fluorocarbon elastomer coating having an adhesive catalyst mixed therein, said elastomer coating applied directly on a surface of said substrate; and
   a plurality of perforations, each perforation being bounded by edges, said perforations being formed through said substrate and said elastomer coating after said elastomer coating is applied to said substrate such that said edges of said perforations do not have any elastomer applied thereon.

2. A diffuser membrane as set forth in claim 1, wherein said edges of said perforations are treated with a biocidal agent.

3. A diffuser membrane as set forth in claim 1, wherein:
   said substrate includes an inside surface and an outside surface; and
   said fluorocarbon elastomer coats both said inside surface and said outside surface.

4. A diffuser membrane as set forth in claim 3, wherein said edges of said perforations are treated with a biocidal agent.

5. A flexible gas diffuser membrane for applying gas to a liquid, comprising:
   a flexible substrate applicable to a diffuser body;
   a fluorocarbon elastomer coating having an adhesive catalyst mixed therein, said elastomer coating applied directly on a surface of said substrate; and
   a plurality of perforations, each perforation being bounded by edges, said perforations being formed through said substrate and said elastomer coating after said elastomer coating is applied to said substrate to provide perforations having uncoated edges.

6. A diffuser membrane as set forth in claim 5, wherein said uncoated edges are treated with a biocidal agent.

* * * * *